(12) United States Patent
Afanador (10) Patent No.: US 8,695,735 B2
(45) Date of Patent: Apr. 15, 2014

(54) TRIANGLE TRACK VEHICLE WHEEL (76) Inventor: Angelo Afanador, Spring Hill, FL (US)

( * ) Notice: Subject to any disclaimer, the term of this patent is extended or adjusted under 35 U.S.C. 154(b) by 596 days.

(21) Appl. No.: 13/031,021

(22) Filed: Feb. 18, 2011

(65) Prior Publication Data

US 2012/0211288 A1 Aug. 23, 2012

(51) Int. Cl.
B62D 55/04 (2006.01)

(52) U.S. Cl.
USPC .............................. 180/9.21; 180/9.1; 180/7.1

(58) Field of Classification Search
USPC ....................................... 180/9.21, 9.1, 9, 7.1
See application file for complete search history.

(56) References Cited

U.S. PATENT DOCUMENTS

| 3,689,123 | A | * | 9/1972 | Barbieri | 305/143 |
| 4,448,273 | A | * | 5/1984 | Barbieri | 180/9.21 |
| 4,953,919 | A | * | 9/1990 | Langford | 305/144 |
| 5,388,656 | A | * | 2/1995 | Lagasse | 180/9.21 |
| 5,954,148 | A | * | 9/1999 | Okumura et al. | 180/9.21 |
| 6,283,562 | B1 | * | 9/2001 | Tsubota et al. | 305/135 |
| 6,874,586 | B2 | * | 4/2005 | Boivin et al. | 180/9.26 |
| 2008/0011524 | A1 | * | 1/2008 | Despres | 180/9.21 |

* cited by examiner

Primary Examiner — Kevin Hurley
Assistant Examiner — Michael Stabley
(74) Attorney, Agent, or Firm — Christopher J. Vandam, PA; Chris Vandam (57) ABSTRACT A triangular continuous track device is disclosed for direct replacement of a conventional tire and wheel combination found commonly on cars, trucks and other vehicles. A hub on the device is provided for direct bolt onto vehicles with a standard wheel bolt pattern. A track tensioning feature allows the track to be installed or repaired without removing the device from the vehicle. Grooves on the wheels are provided that engage with ribs on the inside of the track to efficiently transfer power from a power wheel in direct communication with the vehicle's axle to the two bottom idle wheels. The two idle wheels are centered under the power wheel and are held in ground contact by the weight of the vehicle. Other features as shown and disclosed are also provided.

3 Claims, 6 Drawing Sheets

TRIANGLE TRACK VEHICLE WHEEL

BACKGROUND OF THE INVENTION

1. Field of the Invention

The present invention relates to motor vehicle wheels, and more particularly, to a continuous track wheel replacement for a conventional wheel and tire.

2. Description of the Related Art

Several designs for continuous track vehicles have been designed in the past. None of them, however, includes a gravity stabilized track system with temporarily affixable stabilization arms to keep the device centered below a vehicle and that can be stowed when not needed, a bumper wheel to prevent damage when the track bottoms out under extreme use conditions and an easily tensionable continuous track that can also be replaced without removal of the entire device from the vehicle during service.

Applicant believes that the closest reference corresponds to U.S. Pat. No. 4,448,273 issued to Barbieri. However, it differs from the present invention because the Barbieri device lacks a means to effectively stabilize the tracks against the ground. Further, the present invention distinguishes itself from the prior art by providing a mechanical means to tension the continuous track while the device remains attached to the vehicle. This tension adjustability feature also allows the tension of the continuous track to be adjusted during a brief stop to accommodate changing ground conditions and to remove play from a worn or heated continuous track. The tension adjuster also permits replacement of the continuous track without removing the entire device from the vehicle also saving time and effort.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a direct replacement alternative to tire and wheel drive train systems for motorized vehicles that bolts onto a vehicle axle without modification to the vehicle.

It is another object of this invention to provide an off road or inclement weather vehicle traction system that can be installed and maintained by a single person with basic, commonly available tools and equipment.

It is still another object of the present invention to provide a triangle track wheel that permits the continuous track to be re-tensioned by a single person in a comparably short amount of down time.

Another object of the present invention is to provide a device with minimal moving parts resulting in few points of potential failure.

It is yet another object of this invention to provide such a device that is inexpensive to manufacture and maintain while retaining its effectiveness.

Further objects of the invention will be brought out in the following part of the specification, wherein the detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, where the present invention is generally referred to with numeral 10, it can be observed that it basically includes a track assembly 26 and a frame assembly 15 that are further comprised of a power wheel 12, an idle wheel 14, an idle wheel 16, a frame 18, a hub 20, a bearing 22 and bearing 24, a handle 28, an arch 30, a handle 32, apertures 33, a fastener 34, a fastener 36, braces 38, hinges 39, brackets 40, a cover 41, an arch 42, a fastener 43, a post 44, a post 46, a post 48, ribs 50, grooves 52, a track 54, treads 56, an axle 58, an axle 60, an axle 62, a rim 63, carriage 64, a channel 65, a retainer 66, a rim 67, a track 68, a bearing 69, a head 70, a bracket 72, a rod 74 and a bumper 76. Vehicle 11 and wheel well 13 are not part of the claimed invention and are shown for contextual purposes.

Figure 1:
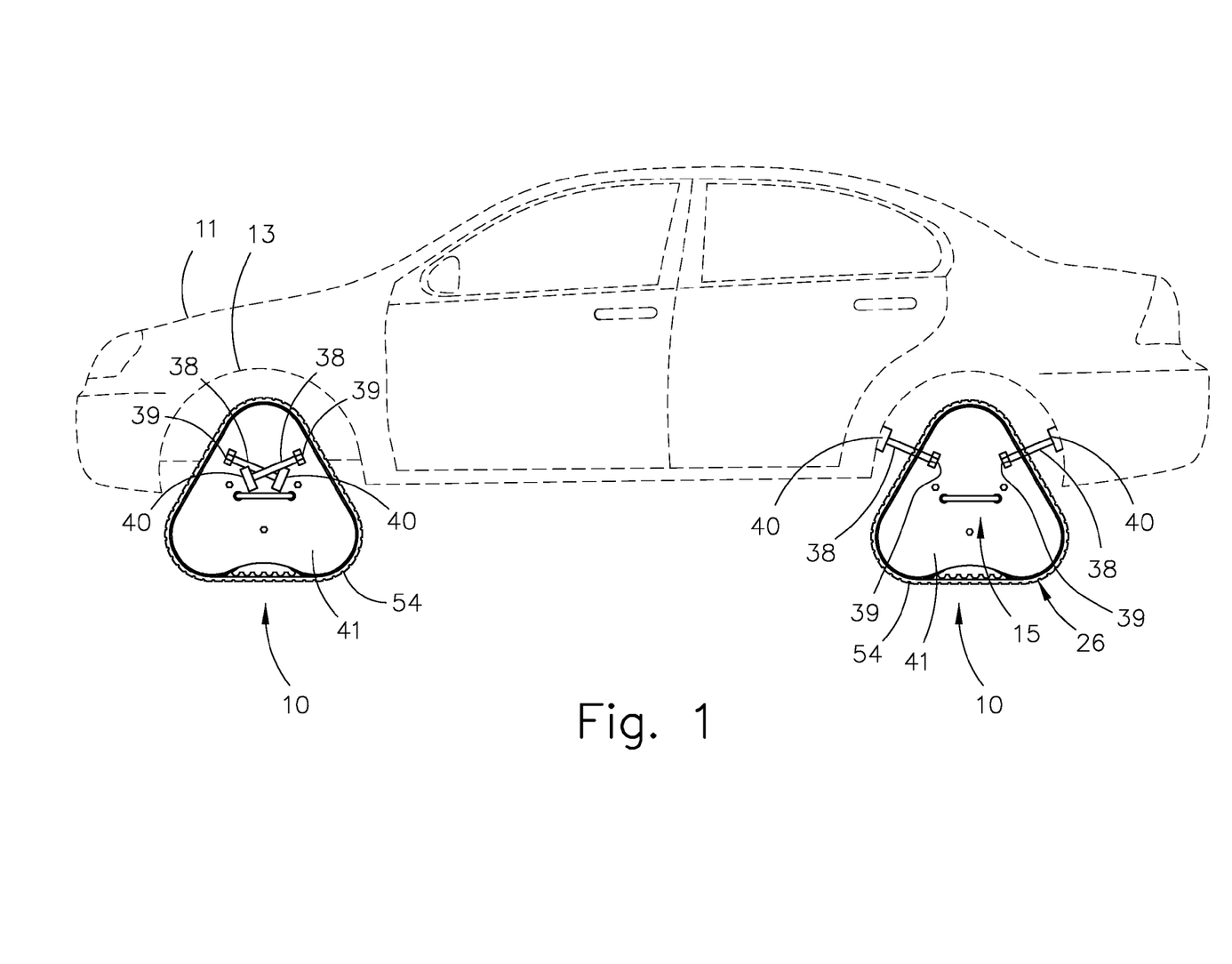
FIG. 1 represents an elevation view of a pair of the devices, one each mounted to the front and rear axles of a vehicle.

Referring now to FIG. 1 where a triangle track vehicle wheel (sometimes referred to as the device or the invention) is mounted to the front axle of a vehicle 11 and another is mounted to the rear axle of the same vehicle 11. It can now be readily understood that generally the device is a direct replacement for the ubiquitous rubber tire and metal rim combination found on most production cars, trucks and other vehicles made today.

FIG. 1 is useful in that it demonstrates the brace 38 that may be utilized to stabilize the device and to ensure that the bottom, ground contacting edge of the track 54 remains in contact with the ground while the device is in motion. Generally, a pair of braces 30 are available on each device although it may be effective for some applications to have a single brace 38 or no brace 38 at all.

A hinge 39 is provided at one end of the brace 38 to allow the brace 38 to be folded and secured against the cover 41 when not in use or during transport or repair. At the opposite end of each brace 38 is a bracket 40. The bracket 40 attaches to the vehicle 11 at wheel well 13 to provide optional support to the device ensuring that the track 54 remains in ground contact directly under the axle of the vehicle 11.

In some situations it may be necessary to use the brace 38 on the front steering axle of the vehicle 11. The braces 38 may restrict steering to some degree and thus might only be used safely at low speeds and for limited distances. However, with the braces 38 folded against the cover 41 the normal steering and suspension of the vehicle is regained and normal operations can resume.

Figure 2:
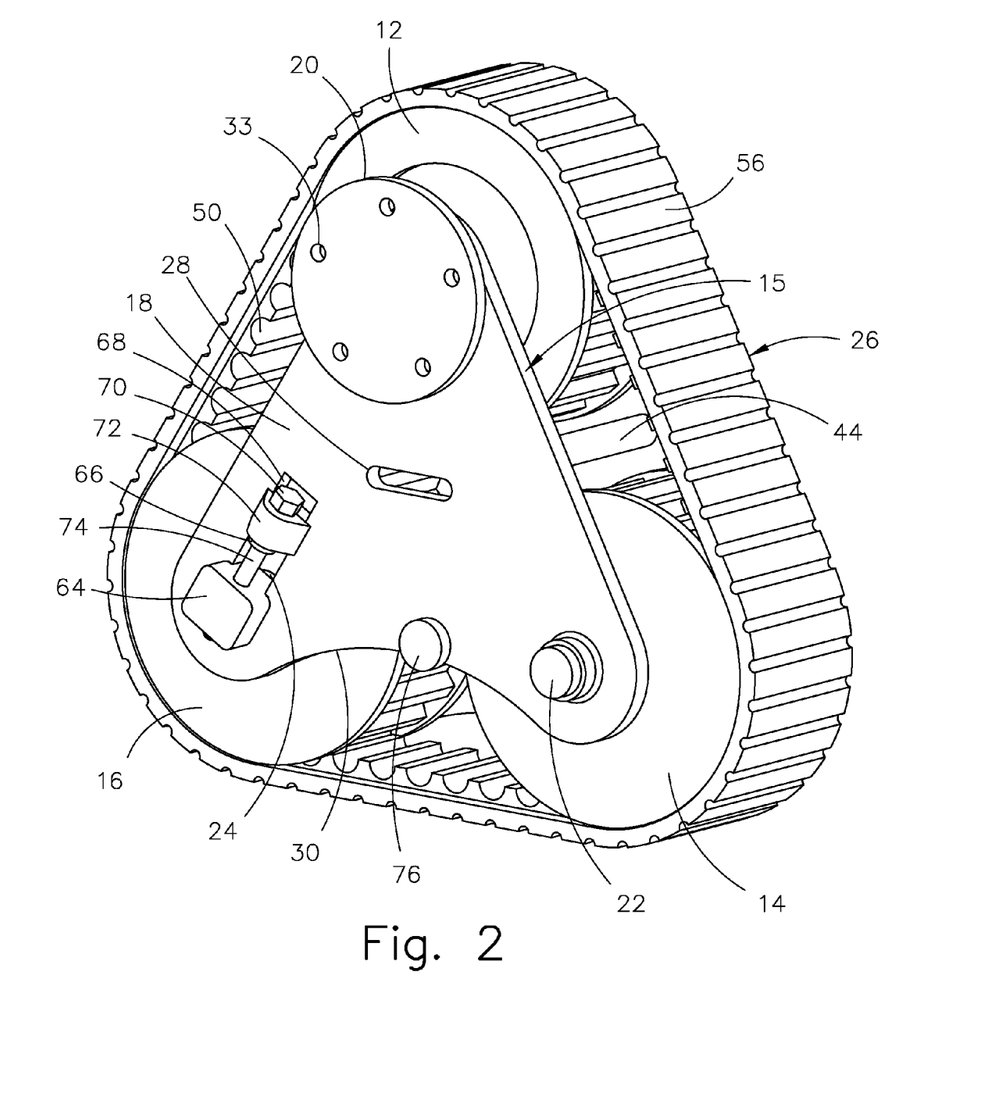
FIG. 2 shows a perspective view of the inside (vehicle side) of an example of the device.

Referring to FIG. 2 where the device is shown removed from the vehicle 11 exposing the inside of the device. Generally, all components of the device are held into place relative to the frame assembly 15. The power wheel 12 generally forms the apex of the triangle shape of the device. Idle wheel 16 and idle wheel 14 form the base of the triangle. The track assembly 26 wraps around the power wheel 12, idle wheel 14 and idle wheel 16.

The power wheel 12 is directly connected to the hub 20 such that when the hub 20 makes one revolution the power wheel 12 makes exactly one revolution. An axle 58 (shown in FIG. 7) transverses the frame 18 through the bearing 69 that decreases the rotary friction as the power wheel 12 turns and supports the power wheel 12. Preferably, bearing 69 is sealed to keep out debris and moisture and is also replaceable when it becomes overly worn. Bearing 69 may be further characterized as being a ball bearing assembly, roller bearing assembly or other bearing assembly that may be known in the state of the art.

Most civilian vehicles are powered by a motor that delivers rotational power through a transmission and differential to an axle which is in turn connected to a rubber tire and wheel combination. The present invention replaces the rubber tire and wheel combination. The invention directly connects to the axle of the vehicle by means of the same lugs that hold the tire and wheel to the axle. Hub 20 is provided with apertures 33 that match the lug pattern of the standard wheel and tire combination that it replaces. Therefore, the invention can directly replace the standard wheel and tire without modification of the vehicle 11. In most applications the lug nuts used to fasten the standard wheel and tire to the axle may be used to fasten the hub 20 to the axle of the vehicle 11.

Various lug patterns of the apertures 33 may be utilized depending on the make and model of the vehicle to which the invention is to be attached so that the apertures 33 line up directly with the corresponding wheel attachment bolts at the terminus of the vehicle's axle. In an alternate variation the apertures 33 may be in a predetermined pattern and an adapter plate may be provided that on one end has a lug pattern that matches a specific make and model of vehicle and on the other end matches the pattern of apertures 33 on the hub 20.

Bearing 22 permits the idle wheel 14 to freely rotate relative to the frame 18 and track truly. Preferably the bearing 22 is sealed to keep out moisture and other foreign objects that could damage or corrode the bearing 22. Bearing 22 may employ ball bearings, roller bearings or other suitable bearing that may be available in the art.

The track assembly 26 is provided that performs the role of transferring the rotational energy from the vehicle, through the power wheel and around the idle wheel 14 and idle wheel 16. The track assembly 26 has on the outside edge a series of treads 56 that are formed perpendicular to the length of the track assembly 26. On the inside of the track assembly 26 are a series of ribs 50. The ribs 50 mate with the grooves 52 around the idle wheel 14, idle wheel 16 and similar grooves on the power wheel 12. The grooves 52 and ribs 50 work in combination to prevent the track assembly 26 from slipping against the power wheel 12 and idle wheels 14 & 16 thereby applying the maximum torque from the engine of the vehicle 11 to the track assembly 26.

Figure 3:
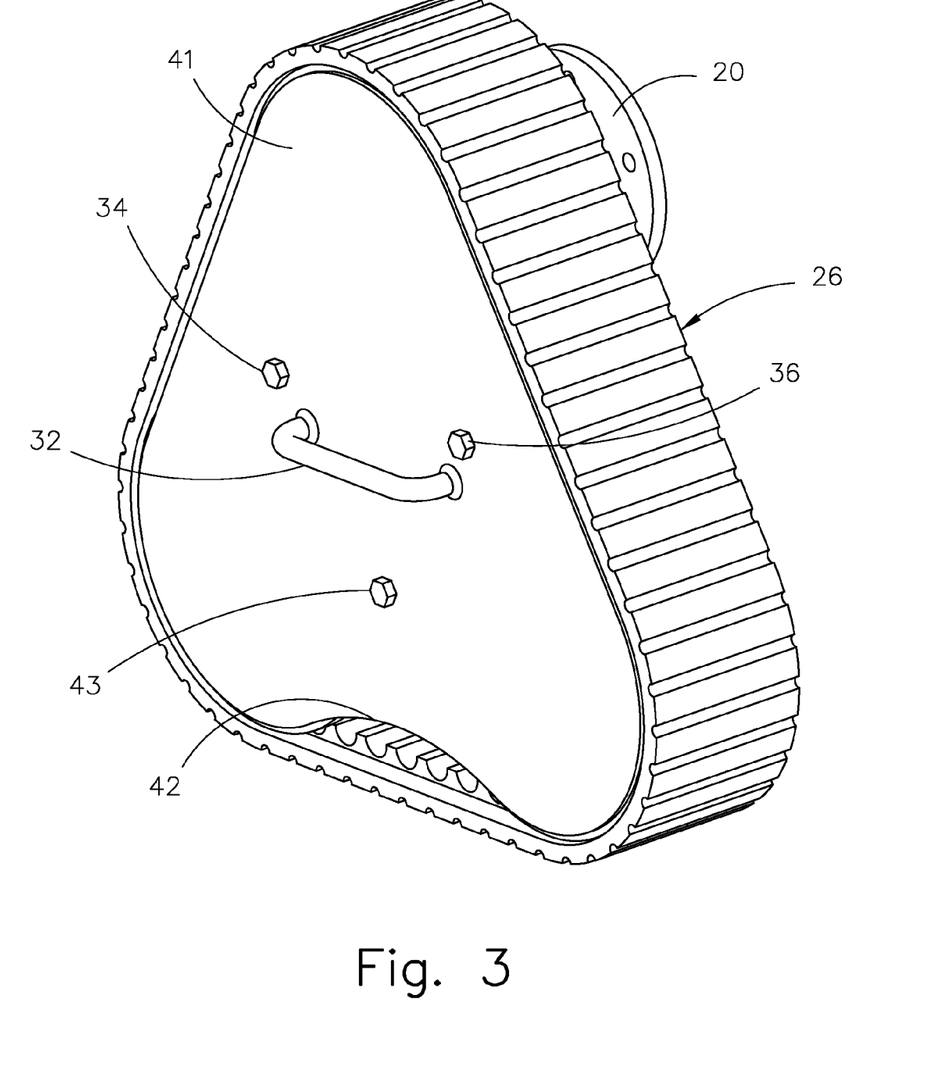
FIG. 3 illustrates a perspective view of the outside of a variation of the device as it may be assembled with a protective cover.

Treads 56 may take the form of bars as demonstrated in FIGS. 2 and 3 or may take on other forms depending on the application. For example a smooth, broad track may be suitable for use on a golf course where it is more important to avoid sinking into the ground and creating trenches. The treads 56 may take the form of scoops when used on surfaces such as sand. Icy or snowy surfaces may also require an alternate tread design to maximize traction on slippery surfaces. Other tread designs may be useful for a variety of other specialized applications beyond those disclosed here as needed.

A tensioning means is also provided to facilitate easier removal and installation of the track assembly 26 onto the idle wheels 14 and 16 and the power wheel 12. The bearing 24 connects the idle wheel 16 to the frame assembly 15 and allows unrestricted rotation of the idle wheel 16. The bearing 24 is integral to a carriage 64. The carriage 64 is dimensioned to fit in and ride along the track 68. Generally, the track 68 spans from near the edge of the frame 18 towards the center of the frame 18 so that when the carriage 64 is nearer the edge of the frame 18 maximum tension is imparted into the track assembly 26. Conversely, when the carriage 64 is at the opposite end of the track 68, nearer the center of the frame 18, then the tension on the track assembly 26 is at a minimum. The location of the track 68 and the length of the track assembly 26 should be predetermined to allow the appropriate amount of tension experienced by the track assembly 26.

Along the length of the rod 74 are threads that mate with female threads in the carriage 64. The bracket 72 is permanently affixed to the frame 18 near the center end of the track 68. The rod 74 passes through the bracket 72 and can freely rotate relative to the bracket 72. The rod 74 is held and prevented from moving axially on either side of the bracket 72 by the head 70 on one side and by the retainer 66 on the other. One end of the rod 74 has a hex head 70 that can be turned by a common wrench. When rotated in a first direction the male threads on the rod 74 engage into the female threads of the carriage 64 thereby drawing the carriage 64 closer to the bracket 72 resulting in tension on the track assembly 26 to be reduced. When rotated in a second direction the rod 74 pushes the carriage 64 away from the bracket 72 resulting in tension on the track assembly 26 to be increased.

The position of the carriage 64 along the length of the track is adjustably held into place by means of the rod 74. The rod 74 is fixed into place by the bracket 72. The rod 74 rotatably fits through the bracket 72 and is held in place relative to the bracket 72 on one end by the head 70 and retainer 66. In a preferred embodiment, the head 70 of the rod 74 is hexagonally shaped similar to the hex head of a common bolt so that the head 70 and conjoined rod 74 can be rotated with a common wrench. To adjust the tension on the track assembly 26 the head 70 is rotated to draw toward or push the carriage 64 away from the bracket 72. The distance between the carriage 64 and bracket 72 is directly related to the tension on the track assembly 26.

To install a track assembly 26 onto the frame assembly 15 the idle wheel 16 must be moved toward the center of the frame 18 by turning fastener 70 which causes the carriage 64, onto which idle wheel 16 is rotatably affixed, to move along the track 68. This effectively reduces the distance around the frame assembly 15 so that a track assembly 26 may be placed over the idle wheel 14, idle wheel 16 and power wheel 12 and so that the ribs 50 on the inside surface of the track assembly 26 engage into the grooves 52 on the outside of all three of said wheels 12, 14 and 16. The track assembly 26 is then tensioned by turning the head 70 so that the carriage 64 is moved, joined along with idle wheel 16, away from the center of the frame assembly 15.

As clearly shown on FIG. 2, a bumper wheel 76 is provided. The bumper wheel 76 prevents damage on the track assembly 26 from contacting the frame 18 during extreme use. In normal operation the bumper wheel 76 does not touch nor interfere with any of the other moving parts on the device. For example, when the device is used to move over an obstacle, such as a log or rock, and the pressure from the weight of the vehicle 11 is borne by the track assembly 26 section between the idle wheel 14 and idle wheel 16 the track assembly 26 may deform and under extreme force may contact and spin the bumper wheel 76 instead of the frame 18 and thereby avoid damage to the frame assembly 15 and the track assembly 26.

Handle 28 on the frame assembly 15 and handle 32 on the cover 41 are provided to aid an installer of the invention to safely transport and attach the invention to a vehicle.

A cover 41 is optionally provided to prevent the entry of foreign objects, such as rocks or other debris, into the moving parts of the frame assembly 15 during use. Fasteners 34, 36 and 43, shown in FIG. 3, affix the cover 41 to the frame assembly 15 by threading onto posts 44, 46 and 48, shown in FIG. 4. The posts 44, 46 and 48 are integral to the frame assembly 15 and work to keep the cover from contacting the wheels 12, 14 and 16. An arch 42 is also provided to allow flex in the track assembly 26 without interfering with the cover 41.

Figure 4:
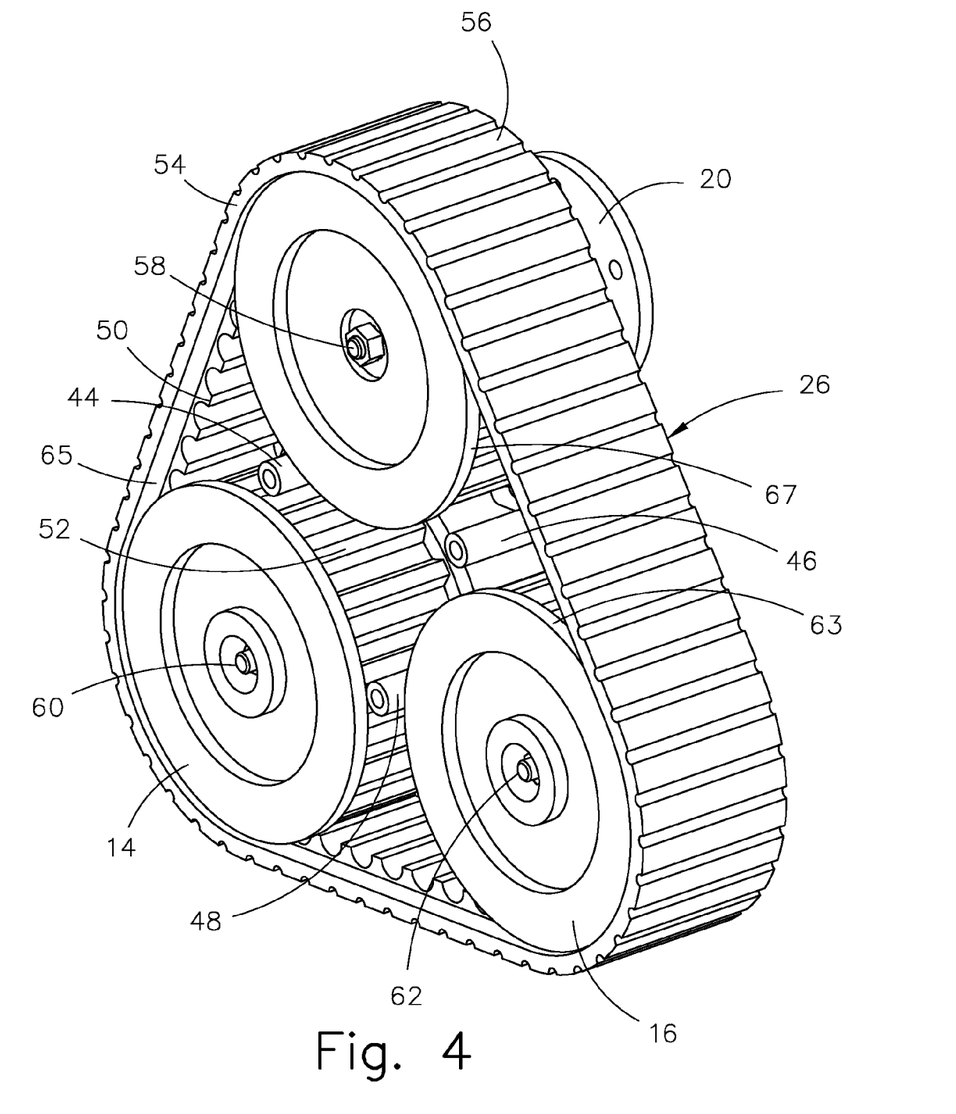
FIG. 4 is a representation of a perspective view of the outside of an embodiment of the device as it may be assembled without a protective cover thus showing in more detail the several components.

The cover 41 may also be removed for maintenance so that the entire device need not be removed from the vehicle 11. Axle 58, axle 60 and axle 62 can be accessed easily when the cover 41 is removed. With the axle nut removed the wheels 12, 14 and 16 can be removed to facilitate repair and maintenance on the bearings 22, 24 and 69 that permit unrestricted rotation of the wheels 12, 14 and 16.

Figures 5, 6:
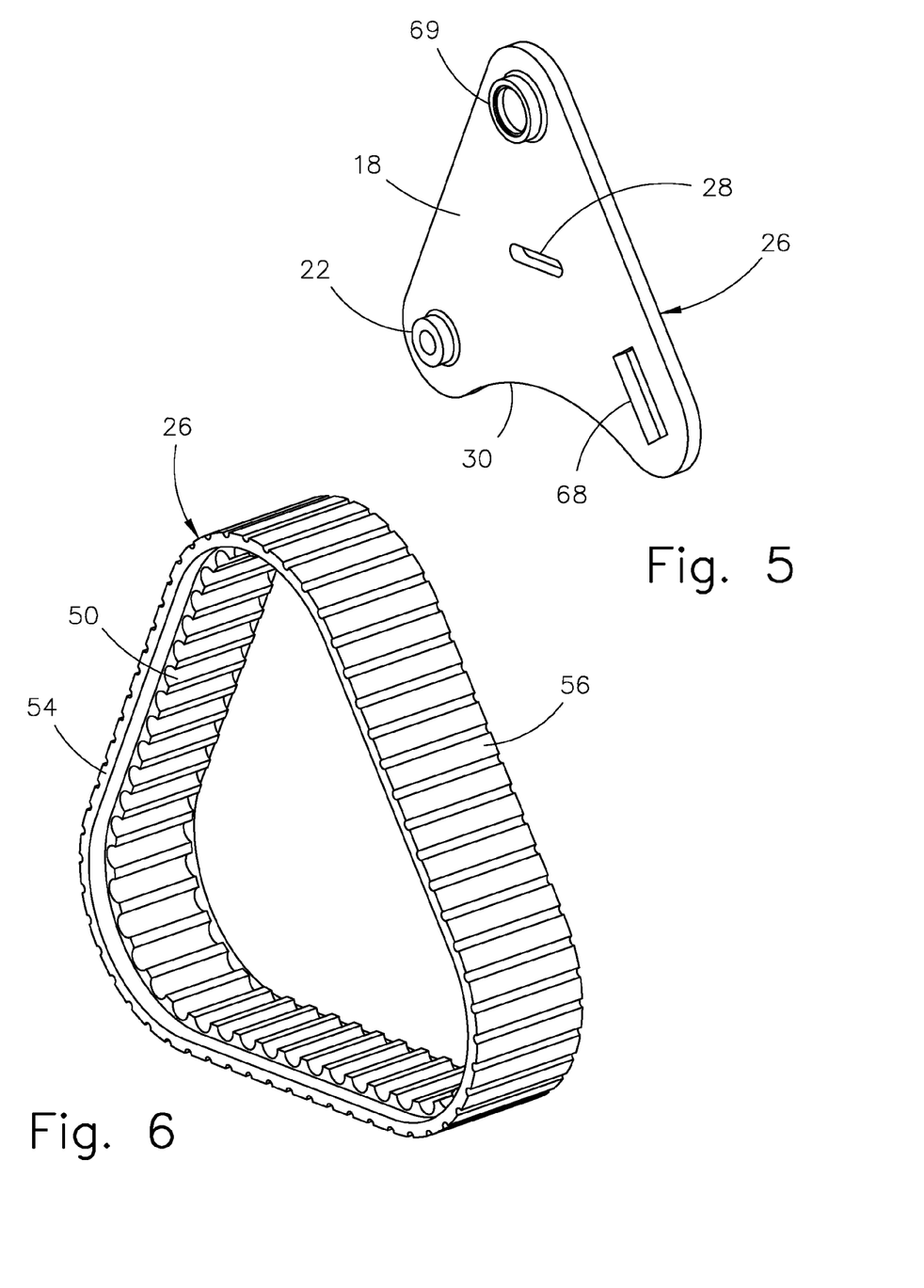
FIG. 5 is a perspective view of a frame assembly.
FIG. 6 is a perspective view of an isolated track assembly.

FIG. 5 shows a variation of the frame 18 with the wheels 12, 14 and 16 removed. The track 68 in which the carriage 64 rides, with the carriage 64 removed, is also visible. The arch 30 is present to provide clearance for the track assembly 26 when traversing over difficult terrain to avoid the track assembly from contacting the frame assembly 15 when the track 68 is under stress.

FIG. 6 shows a variation of the track assembly 26 removed from the frame assembly 15 to more clearly show the track 54 and ribs 50 that interface with the grooves 52 on the wheels 12, 14 and 16. An example of a treads 56 on the exterior of the track assembly is demonstrated that may be suited for general purpose. Other tread 56 designs are effective for other purposes such as sand scoops, snow treads or slicks for turf.

Figure 7:
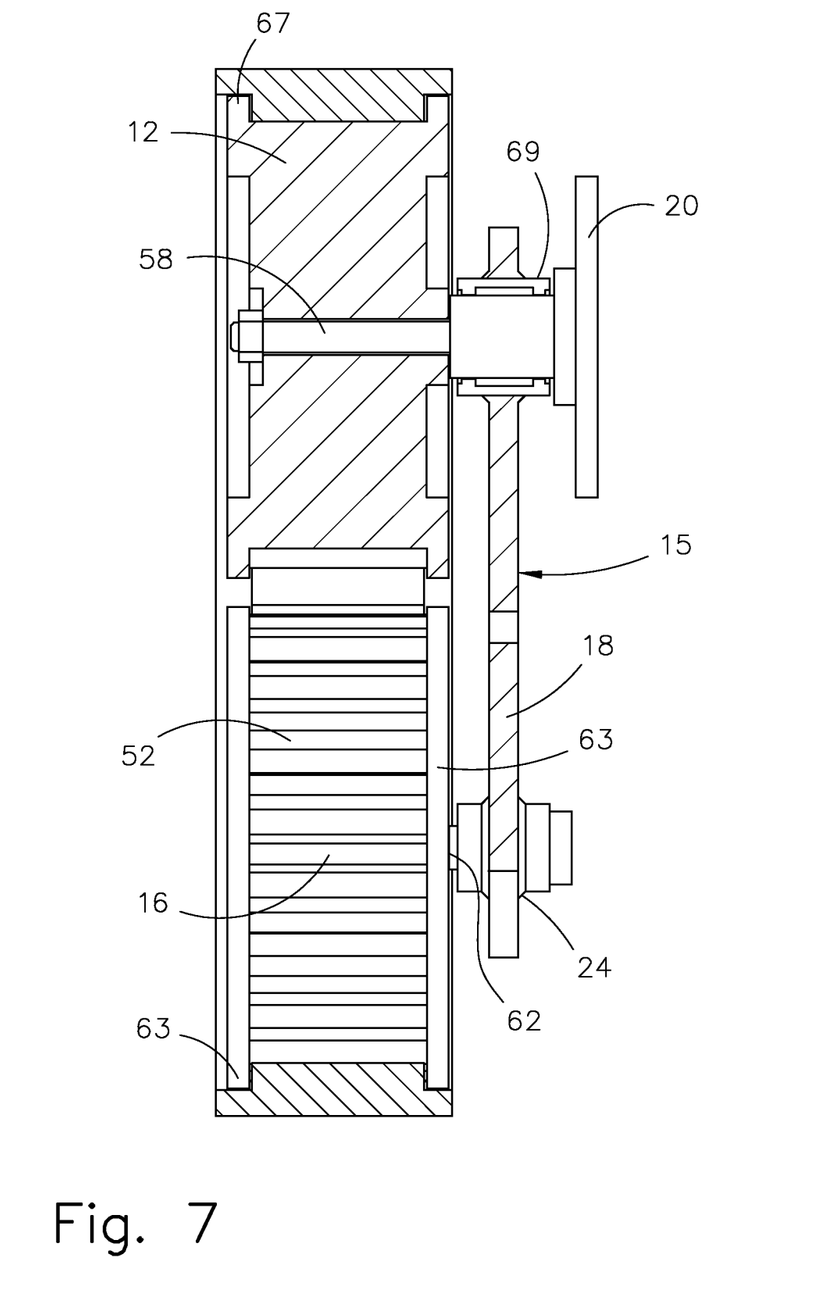
FIG. 7 is an elevational cross section view showing the device without the track assembly or the cover assembly.

FIG. 7 is a cross section showing an alternate view of an example of the interior elements including the axle 58 through the power wheel 12 that is supported by bearing 69. The axle 58 transmits power from the vehicle 11 through the hub 20 and into the power wheel 12. The power is further transferred to the idle wheels 14 and 16 and ultimately to the ground by means of the track assembly 26. The track assembly 26 is prevented from slipping on the idle wheels 14 and 16 by means of the grooves 52 on the idle wheels 14 and 16 grabbing into the ribs 50 on the inside surface of the track assembly 26.

The power wheel 12 has a rim 67 on each edge of the perimeter and the idle wheel 16 has a rim 63 around its perimeter to help keep the track assembly 26 centered over the wheels 12 and 16. Although idle wheel 14 is not shown in FIG. 7 due to the cross section, it too has a rim to keep the track assembly 26 centered. A channel 65 on the inside of both edges of the track assembly 26 mates with the rim 63 and rim 67 to aid in keeping the track assembly 26 centered over the wheels 12, 14 and 16.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A motor vehicle accessory affixable to a standard predetermined vehicle wheel hub comprising a frame assembly and a track assembly;
    said frame assembly further comprised of a frame, a power wheel, a first idle wheel and a second idle wheel;
    said frame is formed of a rigid plate having a first surface, a second surface, a first edge, a second edge and a third edge;
    said frame having integrated a first wheel bearing, a second wheel bearing and a third wheel bearing;
    said first wheel bearing supporting a first axle, said first axle has a first end and a second end;
    said first axle traverses through said frame where said first end of said first axle extends a predetermined distance beyond said first surface of said frame and said second end of said first axle extends a predetermined distance beyond said second surface of said frame;
    said power wheel is affixed to said first end of said first axle and a hub is affixed to said second end of said first axle;
    said hub is dimensioned to interface and be affixed to a preselected standard vehicle hub;
    said second wheel bearing supports a second axle, said second axle has a first end and a second end;
    said first end of said second axle extends a predetermined distance beyond said first surface of said frame and at said second end of said second axle terminates at said second wheel bearing;
    said first idle wheel affixed to said first end of said second axle;
    said third wheel bearing supporting a third axle, said third axle has a first end and a second end;
    said first end of said third axle extends a predetermined distance beyond said first surface of said frame and at said second end terminates at said third wheel bearing;
    said second idle wheel affixed to said first end of said third axle;
    said third wheel bearing is integral to a moveable carriage;
    said carriage is adjustable and affixable along the length of a track providing a means to adjust tension experienced by the track assembly;
    said track assembly further comprised of a continuous track having a first side with integral treads and a second side that maintain contact with and wrap around the group of said power wheel, said first idle wheel and said second idle wheel;
    a cover that is removeably affixed to a plurality of posts;
    said posts are affixed to said first surface of said frame and effectively covers said power wheel, said first idle wheel and said second idle wheel.

2. A motor vehicle accessory as disclosed in claim 1, further characterized in that one or two braces are provided that in a first position are folded against said cover and in a second position fold out to affix to said motor vehicle.

3. A motor vehicle accessory affixable to a standard predetermined vehicle wheel hub comprising a frame assembly and a track assembly;
    said frame assembly further comprised of a frame, a power wheel, a first idle wheel and a second idle wheel;
    said frame is formed of a rigid plate having a first surface, a second surface, a first edge, a second edge and a third edge;
    said frame having integrated a first wheel bearing, a second wheel bearing and a third wheel bearing;
    said first wheel bearing supporting a first axle, said first axle has a first end and a second end;

said first axle traverses through said frame where said first end of said first axle extends a predetermined distance beyond said first surface of said frame and said second end of said first axle extends a predetermined distance beyond said second surface of said frame;

said power wheel is affixed to said first end of said first axle and a hub is affixed to said second end of said first axle;

said hub is dimensioned to interface and be affixed to a preselected standard vehicle hub;

said second wheel bearing supports a second axle, said second axle has a first end and a second end;

said first end of said second axle extends a predetermined distance beyond said first surface of said frame and at said second end of said second axle terminates at said second wheel bearing;

said first idle wheel affixed to said first end of said second axle;

said third wheel bearing supporting a third axle, said third axle has a first end and a second end;

said first end of said third axle extends a predetermined distance beyond said first surface of said frame and at said second end terminates at said third wheel bearing;

said second idle wheel affixed to said first end of said third axle;

said third wheel bearing is integral to a moveable carriage;

said carriage is adjustable and affixable along the length of a track providing a means to adjust tension experienced by the track assembly;

said track assembly further comprised of a continuous track having a first side with integral treads and a second side that maintain contact with and wrap around the group of said power wheel, said first idle wheel and said second idle wheel;

one or two handles are provided affixed to said frame assembly.

* * * * *